United States Patent [19]
Yamada

[11] Patent Number: 5,907,852
[45] Date of Patent: May 25, 1999

[54] DOCUMENT EDITING APPARATUS

[75] Inventor: Hiroshi Yamada, Tokyo, Japan

[73] Assignee: NEC Corporation, Tokyo, Japan

[21] Appl. No.: 08/595,584

[22] Filed: Feb. 1, 1996

[30] Foreign Application Priority Data

Feb. 1, 1995 [JP] Japan ................................. 7-014953

[51] Int. Cl.$^6$ ..................................................... G06F 3/00
[52] U.S. Cl. ............................................................ 707/541
[58] Field of Search ................................. 707/541, 530, 707/508, 509

[56] References Cited

U.S. PATENT DOCUMENTS

| | | | |
|---|---|---|---|
| 5,267,327 | 11/1993 | Hirayama | 382/13 |
| 5,416,890 | 5/1995 | Beretta | 395/131 |
| 5,737,740 | 4/1998 | Henderson et al. | 707/530 |
| 5,742,279 | 4/1998 | Yamamoto et al. | 345/173 |

OTHER PUBLICATIONS

NEC Windows for Pens 1.1, Software Library, PC–9800, pp. 39–40.

Souya et al., "A Prototype of a Document Preparation System Through Handwriting Employing Lazy Recognition Scheme", vol. 43, No. 4, pp. 25–32, (1992).

*Primary Examiner*—Joseph H. Feild
*Assistant Examiner*—Alford W. Kindred
*Attorney, Agent, or Firm*—Foley & Lardner

[57] ABSTRACT

The invention provides a document editing apparatus by which a hand-written inputted editing operation can be reflected on a document without deterioration of the efficiency in editing operation. Editing operations recognized by an editing operation recognition section based on locus data, that is, information hand-written inputted using a locus data inputting section, are stored once into an editing operation storage section. Each time an editing operation is inputted, an editing operation which satisfies a determination condition stored in a determination condition storage section is searched from among the editing operations stored in the editing operation storage section by a determination section. Then, only the editing operation thus searched out is reflected on the document by a document editing section.

5 Claims, 11 Drawing Sheets

FIG. 2

| POSITION | EDITING TYPE | FIRST CHARACTER STRING | SECOND CHARACTER STRING |
|---|---|---|---|
| 30 | INSERTION | regarding | |
| 45 | DELETION | apparatus | |
| 83 | REPLACEMENT | sentence | DOCUMENT |

FIG. 3

Recently, apparatus wherein a pen is used to perform character inputting have been and are being spread. Inputting with a pen is simple in operation and arouses a comparatively low resistance to a beginner.\<CR\>

The authors have developed a pen based document production system on which production of a whole document can be executed entirely with a pen in order to make the most of the advantage of the inputting with a pen.\<CR\>

FIG. 4

Recently, apparatus wherein a pen is and an operation used to perform character inputting have been and are being spread. Inputting with a pen is simple in operation and arouses a comparatively low resistance to a beginner. <CR>

The authors have developed a pen based document production system on which production of a whole document can be executed entirely with a pen in order to make the most of the advantage of the inputting with a pen. <CR>

FIG. 5

| POSITION (31) | EDITING TYPE (32) | FIRST CHARACTER STRING (33) | SECOND CHARACTER STRING (34) |
|---|---|---|---|
| 79 | INSERTION | and an operation | |

FIG. 6

Recently, apparatus wherein a pen is
‿and an operation‿
used to perform character inputting have
been and are being spread.  Inputting
with a pen is simple in operation and
arouses a comparatively low resistance to
a beginner.<CR>

The authors have developed a pen
based document production system on which
production of a whole document can be
executed ~~ent~~irely with a pen in order to
make the most of the advantage of the
inputting with a pen.<CR>

FIG. 7

Recently, apparatus wherein a pen is used to perform character inputting and an operation have been and are being spread. Inputting with a pen is simple in operation and arouses a comparatively low resistance to a beginner.<CR>

The authors have developed a pen based document production system on which production of a whole document can be executed ~~entirely~~ with a pen in order to make the most of the advantage of the inputting with a pen.<CR>

FIG. 11

Recently, apparatus wherein a pen is
editing of document
used to perform (character inputting) have
been and are being spread. Inputting
with a pen is simple in operation and
arouses a comparatively low resistance to
a beginner.<CR>

FIG. 12

| POSITION (31) | EDITING TYPE (32) | FIRST CHARACTER STRING (33) | SECOND CHARACTER STRING (34) |
|---|---|---|---|
| 59 | REPLACEMENT | character inputting | editing of document |

FIG. 13

Recently, apparatus wherein a pen is used to perform editing of document have been and are being spread. Inputting with a pen is simple in operation and arouses a comparatively low resistance to a beginner.<CR>

The authors have developed a pen based document production system on which production of a whole document can be executed entirely with a pen in order to make the most of the advantage of the inputting with a pen.<CR>

FIG. 14

Recently, apparatus wherein a pen is
 and an operation
used to perform character inputting have been and are being spread. Inputting with a pen is simple in operation and arouses a comparatively low resistance to a beginner.<CR>

FIG. 15

> Recently, apparatus wherein a pen is used to perform character inputting and an operation [h]ave been and are being spread. Inputting with a pen is simple in operation and arouses a comparatively low resistance to a <u>beginner.</u> <CR>

DOCUMENT EDITING APPARATUS

BACKGROUND OF THE INVENTION

1. Field of the Invention

This invention relates to a document editing apparatus, and more particularly a document editing apparatus by which a document can be edited by handwritten inputting of characters.

2. Description of the Related Art

In recent years, a document editing apparatus has been put into practical use by which an electronically produced document can be edited in a similar procedure to editing of a document which is performed using paper and a pen.

A document editing apparatus of the type mentioned includes an inputting apparatus for inputting image data (locus data) such as a pen and a pen inputting tablet, and the contents of a manual operation of the inputting apparatus by a user are provided as a set of dots or a set of vectors. Then, the inputted locus data is displayed as an image on a display screen provided on the document editing apparatus and stored into a memory in the document editing apparatus.

The locus data stored in the memory is converted into a character code or a command using a pattern recognition technique, and editing according to a result of the conversion (result of recognition) is performed for a document. It is to be noted that a method wherein several commands (editing operations) are allocated to symbols of particular shapes in advance and deletion of a character, insertion of line feeding or designation of a range is performed by hand-written inputting of one of the symbols is called "gesture recognition".

In this manner, with a document editing apparatus which allows hand-written character inputting, editing of a document is performed in such a procedure as hand-written inputting by a user, pattern recognition of the hand-written inputted information and editing according to a result of the recognition. However, the timings at which various processing steps are performed are different among different apparatus.

For example, with the document editing apparatus "Windows for Pen", if no inputting occurs within a fixed period of time after a user manually writes a character or a gesture on a character inputting field of the apparatus, then pattern recognition is performed by the apparatus. Then, after the recognition is completed, a process according to a result of the recognition, for example, a process of inserting a recognized character string to the cursor position, is performed. (See, for example, NEC Windows for Pen 1.1 Users Guide, p.39).

Meanwhile, with another system described in "A Prototype of a Document Preparation System through Handwriting Employing Lazy Recognition Scheme", Meeting for the Study of Human Interface of the Information Processing Society of Japan, Vol. 43, No. 4, character recognition is performed at a point of time when inputting of a document is all completed or when a user makes a declaration of the intention, and editing according to a result of the recognition is performed.

Although a document editing apparatus on which editing of a document can be performed by hand-written inputting is constructed such that it can be manually operated in a similar procedure as in editing of a document performed using paper and a pen, for example, where the document processing apparatus is of the type wherein editing of a document is performed if no inputting occurs within a fixed period of time after hand-written inputting comes to an end such as the "Windows for Pen", it some times occurs that, while the user is reading the document, the document being read is scrolled on the screen, which deteriorates the efficiency of the editing operation.

The problem Just described will be described in more detail with reference to FIGS. 14 and 15. FIG. 14 illustrates an example of information displayed on the screen of a document editing apparatus immediately after hand-written inputting is performed, and FIG. 15 illustrates information displayed on the screen when a fixed interval of time elapses after the condition shown in FIG. 14 is reached. In the following description, it is assumed that the document editing apparatus is in a mode in which a hand-written inputted character string is inserted to a position forwardly of the cursor position (the portion indicated by a framework in FIG. 14: the position of "h" of "have" on the second line).

In FIG. 14, a user hand writes the character string "and an operation" in order to amend the character sequence "perform character inputting" to another sequence "perform character inputting and an operation". In this instance, the user will perform, after hand-written inputting is performed, elaboration of a succeeding sentence. However, the document editing apparatus executes, independently of the elaboration operation, an inserting operation of the character string "and an operation" after lapse of a predetermined interval of time after the last handwritten inputting is performed.

Consequently, for example, it sometimes occurs that, while the user reads the portion "beginner" shown underlined in FIG. 14, the contents of the screen are rewritten to those shown in FIG. 15. If such re-writing occurs, then the user may miss the reading portion, and may need to re-read the contents beginning with the top of the sentence, which disturbs the document elaboration operation.

Meanwhile, where the document editing apparatus is constructed such that actual editing processing for a document is performed at a point of time when inputting is all completed such as the "Hand Written Manuscript Production Prototype System by the Delay Recognition System" mentioned hereinabove, in order for a user to confirm that editing has been performed in accordance with the user's intention, the user must review the entire amended portion of the document after actual editing processing is completed. On the other hand, where the document editing apparatus is constructed otherwise such that editing processing is executed at a point of time when a user makes a declaration of some intention of it, there is a problem in that a greater number of processing steps are required for the user as compared with the document editing apparatus of the type on which editing of a document is performed if no inputting occurs within a fixed period of time after hand-written inputting comes to an end.

SUMMARY OF THE INVENTION

It is an object of the present invention to provide a document editing apparatus by which a handwritten inputted editing operation can be reflected on a document without deterioration of the efficiency in editing operation.

In order to attain the object described above, according to an aspect of the present invention, there is provided a document editing apparatus, comprising a pointing device, display means for displaying a document to be edited and image data representative of locus data inputted by the pointing device, editing operation storage means for temporarily storing editing operations to be executed for the document displayed on the display means, editing operation recognition means for recognizing, based on the locus data inputted by the pointing device, the editing operations to be executed for the document, determination means for determining, when the editing operations are recognized by the editing operation recognition means, whether or not the editing operations stored in the editing operation storage means include an editing operation which satisfies a predetermined condition, editing operation execution means for executing, when the determination means determines that the editing operations include an editing operation which satisfies the predetermined condition, editing corresponding to the editing operation for the document and erasing the editing operation used for the editing from the editing operation storage means, and editing operation loading means for loading the editing operations recognized by the editing operation recognition means into the editing operation storage means.

In the document editing apparatus, an editing operation instructed by hand-written inputting is stored once into the editing operation storage means. Each time an editing operation is inputted, an editing operation which satisfies a predetermined condition when another editing operation for another portion of the document is executed is searched from among editing operations stored in the editing operation storage means, and only the editing operation thus searched out is executed for the object document. Consequently, an editing operation to be reflected on the document can be selected in accordance with contents of the editing operation without disturbing the editing working. As a result, the efficiency in editing working can be improved.

The condition to be used for the determination by the determination means may be that a portion of the document for which one of the editing operations recognized by the editing operation recognition means is to be performed does not move in the document display means. This assures a comparatively high editing efficiency.

Preferably, the determination means selects the condition to be used for the determination from within a plurality of conditions registered in advance therein. In this instance, the timing at which an editing operation is to be reflected on the document can be selected in accordance with the degree of skill in operation of the user.

Preferably, the pointing device is in the form of a pen. The pointing device in the form of a pen decreases the psychological resistance of the user to operation of the document editing apparatus.

According to another aspect of the present invention, there is provided a document editing apparatus, comprising a pointing device, display means for displaying a document to be edited and image data representative of locus data inputted by the pointing device, editing operation storage means for temporarily storing editing operations to be executed for the document displayed on the display means, editing operation recognition means for recognizing, based on the locus data inputted by the pointing device, the editing operations to be executed for the document, discrimination means for discriminating whether or not the number of characters of the document changes if one of the editing operations recognized by the editing operation recognition means is executed, first editing operation execution means for executing, when the discrimination means discriminates that the number of characters of the document does not change, editing corresponding to the editing operation for the document, determination means for determining, when the editing operations are recognized by the editing operation recognition means, whether or not the editing operations stored in the editing operation storage means include an editing operation which satisfies a predetermined condition, second editing operation execution means for executing, when the determination means determines that the editing operations include an editing operation which satisfies the predetermined condition, editing corresponding to the editing operation for the document and erasing the editing operation used for the editing from the editing operation storage means, and editing operation loading means for loading any of the editing operations determined to cause a change in number of characters by the discrimination means into the editing operation storage means.

In the document editing apparatus, those of editing operations instructed by hand-written inputting which involve an increase or a decrease in number of characters are stored once into the editing operation storage means. Then, when another editing operation is inputted, only those of the editing operations stored in the editing operation storage means which satisfy a predetermined condition are executed for the document. On the other hand, any editing operation which does not involve an increase or a decrease in number of characters is executed immediately without being stored into the editing operation storage means. Consequently, an editing operation to be reflected on the document can be selected in accordance with the contents of the editing working, and as a result, the editing working can be performed with a comparatively high efficiency. Further, since any editing operation which does not have an influence upon any other portion of the document is executed immediately, such a situation that a large number of pieces of hand-written inputted information are present on the screen of the display means can be prevented.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a table illustrating an outline of information stored in an editing operation storage section provided in the document editing apparatus of FIG. 1;

FIG. 3 is a schematic view showing an example of a document displayed on a display section (screen) of the document editing apparatus of FIG. 1;

FIG. 4 is a similar view but showing contents displayed on the display section (screen) of the document editing apparatus of FIG. 1 when information of an instruction for insertion to the document shown in FIG. 3 is hand-written inputted;

FIG. 5 is a table illustrating an outline of information stored in the editing operation storage section when the contents shown in FIG. 4 are displayed;

FIG. 6 is a schematic view showing contents displayed on the display section (screen) when hand-written inputting of information of an instruction for deletion for the document shown in FIG. 4 is completed;

FIG. 7 is a similar view but showing contents displayed on the display section (screen) when the hand-written inputting of information of instruction for deletion for the document shown in FIG. 4 is completed;

FIG. 11 is a schematic view illustrating contents displayed on the display section (screen) of the modified document editing apparatus of FIG. 9 when information of an instruction for replacement is hand-written inputted;

FIG. 12 is a table illustrating contents of an editing operation recognized by an editing operation recognition section of the modified document editing apparatus of FIG. 9 when the hand-written inputting illustrated in FIG. 10 is performed;

FIG. 13 is a schematic view illustrating contents displayed on the display section (screen) of the modified document editing apparatus of FIG. 9 when the editing operation illustrated in FIG. 11 is executed; and FIGS. 14 and 15 are schematic views illustrating a problem of a conventional document editing apparatus.

DESCRIPTION OF THE PREFERRED EMBODIMENT

A document editing apparatus according to a preferred embodiment of the present invention described below includes an information processing apparatus including a CRT (cathode ray tube) monitor and a hard disk unit, and a pen inputting tablet and a pen connected to the information processing apparatus. A CPU (central processing unit) in the information processing apparatus operates in accordance with a predetermined program to systematically control the components of the information processing apparatus to perform editing of a document by hand-written character inputting.

Figure 1:
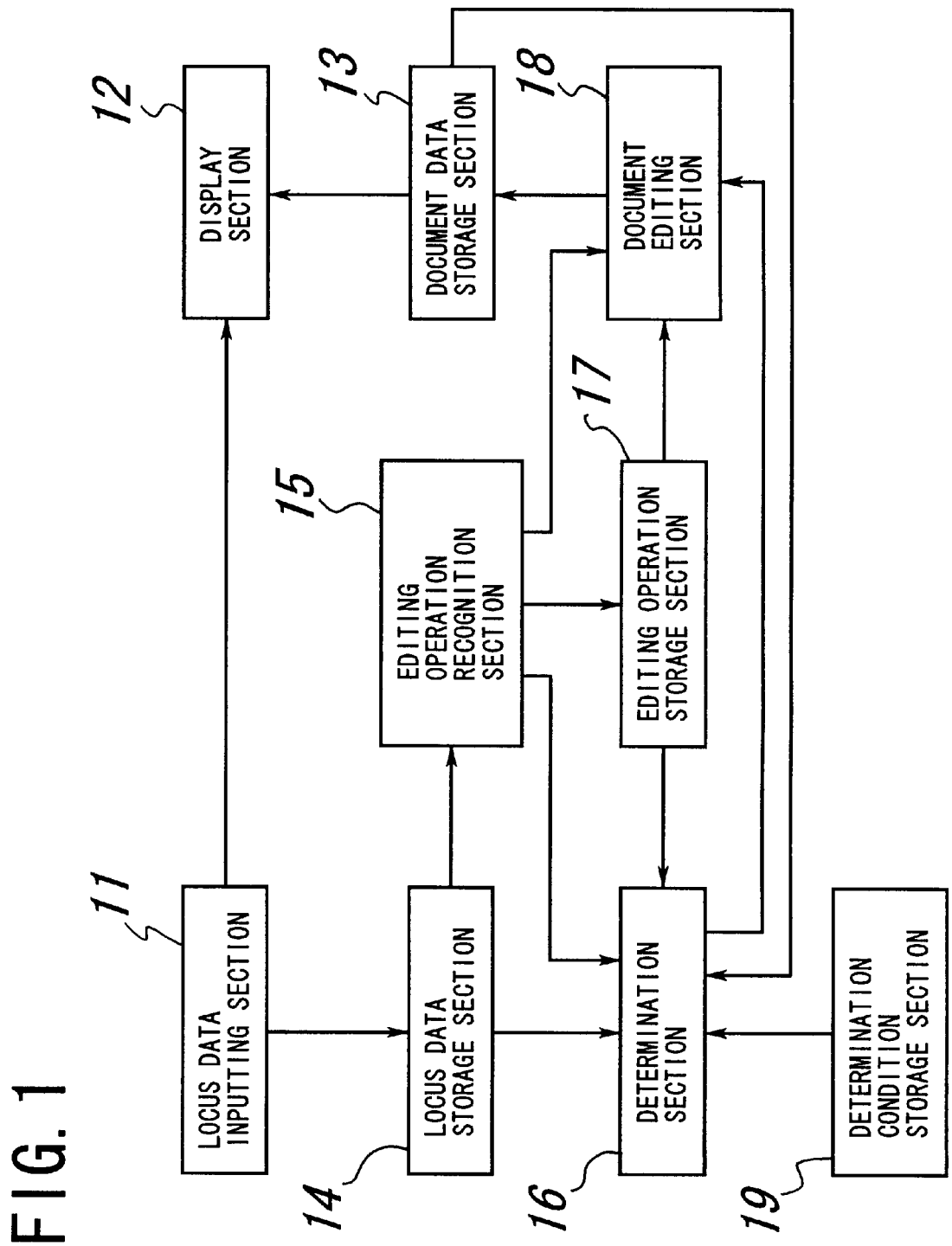
FIG. 1 is a functional block diagram of a document editing apparatus showing a preferred embodiment of the present invention.

Referring to FIG. 1, the document editing apparatus is shown in a functional block diagram. The document editing apparatus includes a locus data inputting section 11 formed from a pen inputting tablet and a pen not shown, and a display section 12 formed from a CRT monitor and a CRT controller not shown. The document editing apparatus further includes several storage sections including a document data storage section 13, a locus data storage section 14 and a determination condition storage section 19 which are formed from a random access memory (RAM) and the hard disk unit not shown in the information processing apparatus. The document editing apparatus further includes several data processing sections including an editing operation recognition section 15, a determination section 16, an editing operation storage section 17 and a document editing section 18, which are realized by respective processes performed in accordance with a predetermined program by the CPU of the information processing apparatus.

The locus data inputting section 11 is used to perform hand-written inputting to the document editing apparatus. Locus data (image data) inputted by a user using the locus data inputting section 11 are supplied to the display section 12 and the locus data storage section 14.

The display section 12 also receives document data (a set of character codes) from the document data storage section 13 and displays on the screen thereof an image corresponding to the document data from the locus data inputting section 11 and a text corresponding to the document data from the document data storage section 13. The document data storage section 13 also stores information which designates a portion of the document data to be displayed on the display section 12, and the display section 12 displays the portion of the document designated by the information on the screen thereof.

The editing operation recognition section 15 performs pattern recognition based on the locus data in the locus data storage section 14 to obtain a character code from the locus data or recognize a command (type of editing) to be executed. The locus data inputted by the user is converted into data which can be interpreted by the determination section 16 and the document editing section 18.

As seen from FIG. 1, information is outputted from the editing operation recognition section 15 to the determination section 16, the editing operation storage section 17 and the document editing section 18. The information to be outputted to the sections 16, 17 and 18, however, is different among them. The information to be outputted to the editing operation storage section 17 will be described first.

FIG. 2 schematically illustrates the stored manner of information in the editing operation storage section 17. The editing operation storage section 17 includes a position information storage region 31, an editing type storage region 32, a first character string storage region 33 and a second character string storage region 34. The editing type storage region 32 stores types of editing such as, for example, deletion or insertion designated by gesture inputting and so forth. The position information storage region 31 stores information defining the positions at which editing operations designated by the types of editing or the like are to be executed.

In the character editing apparatus of the present embodiment, the character code number from the top of document data is employed for the position information, and the position information storage region 31 stores position information based on document positions indicated by locus data and/or the cursor positions. Meanwhile, whether or not information is to be stored into the first character string storage region 33 or the second character string storage region 34 depends upon the type of editing. For example, when the type of editing is "replacement", a character string before the replacement is stored into the first character string storage region 33 while another character string after the replacement is stored into the second character string storage region 34. On the other hand, if the type of editing is "insertion", a character string to be inserted is stored into the first character string storage region 33, but no character string is stored into the second character string storage region 34.

It is to be noted that the document editing apparatus of the present embodiment allows selection of a different type of editing such as designation of a range, line feeding, indent, right adjust, left adjust, centering or character ornament by hand-written inputting. Any instruction to reflect any editing operation on a document can be designated by hand-written inputting.

In this manner, all information recognized based on locus data are notified to the editing operation storage section 17. The notification is performed when recognition of a series of locus data comes to an end. On the other hand, to the determination section 16, only position information is notified at a point of time when the position at which an editing operation designated by hand-written inputting is to be performed is settled. Meanwhile, if the editing operation recognized is an instruction for execution of all editing operations, then the information representing this is notified to the document editing section 18. In this instance, the information is not notified to any of the determination section 16 and the editing operation storage section 17, but all editing operations in the editing operation storage section 17 are executed for document data in the document data storage section 13 by the document editing section 18.

The determination section 16 starts its operation when position information is notified from the editing operation recognition section 15. Then, based on the notified position information and a determination condition stored in the determination condition storage section 19, the determination section 16 determines whether or not an editing operation to be executed is stored in the editing operation storage section 17 referring, if necessary, to the contents of the document data stored in the document data storage section 13.

The determination conditions stored (registered) in the determination condition storage section 19 are in the form of parameters representing position information notified from the editing operation recognition section 15, contents of document data in the document data storage section 13, a displaying form of the document data by the display section 12 and editing operation information (position information, editing type information, first character string information and second character string information) stored in the editing operation storage section 17. The determination section 16 collects, based on the determination conditions stored in the determination condition storage section 19, data necessary for determination from the associated sections and determines whether or not an editing operation to be reflected on the document data is present.

For example, if the determination condition instructing "to execute an editing operation at a position different by more than 10 lines from the position recognized by the editing operation recognition section" or the determination condition instructing "to execute an editing operation for a portion succeeding to the position recognized by the editing operation recognition section" is registered in the determination condition storage section 19, the determination section 16 determines presence or absence of an editing operation to be executed only using position information notified from the editing operation recognition section 15 and editing operation information stored in the editing operation storage section 17.

On the other hand, if the determination condition instructing "to execute an editing operation which includes line feeding or page feeding between the cursor position and a position recognized by the editing operation recognition section", "to execute an editing operation for a paragraph different from the paragraph which includes the position recognized by the editing operation recognition section" or "to execute an editing operation for a portion which is not displayed on the screen" is registered in the determination condition storage section 19, the determination section 16 determines presence or absence of an editing operation to be executed using document data stored in the document data storage section 13 in addition to editing operation information notified from the editing operation recognition section 15 and editing operation information stored in the editing operation storage section 17.

Any of the determination conditions mentioned above allows determination of whether or not an editing operation satisfies the determination condition even if no editing processing is performed actually. The document editing apparatus of the present embodiment, however, is constructed such that a form after completion of editing can be used as a parameter for the determination such as "to execute an editing operation which does not change, when it is executed, the number of lines of the paragraph for which editing is performed". If a determination condition of the type just described is registered, then the determination section 16 copies necessary document data into a working area and executes the editing for the thus copied document data to determine whether or not a result of the editing satisfies the determination condition.

When the determination section 16 finds out an editing operation which satisfies the determination condition, this is notified to the document editing section 18. The document editing section 18 thus executes only such editing operations satisfying the determination condition for the document in the document data storage section 13. It is to be noted that the determination condition storage section 19 is constructed so that a plurality of determination conditions can be registered, and one of the determination conditions which is to be used for the determination can be selected by handwriting inputting.

In the following, operation of the document editing apparatus of the present embodiment will be described in more detail with reference to FIGS. 3 to 8 by way of an example wherein information instructing "to execute an editing operation which is an editing operation for a paragraph different from the paragraph to which the editing operation recognized by the editing operation recognition section is directed and which does not change the number of the paragraph by the editing".

It is to be noted that, as described hereinabove, the document editing apparatus of the present embodiment uses a total number of character codes from the top to a designated position of the document data as position information, and similarly to ordinary document data, no character code is applied to the blank portion succeeding the line feeding mark (<CR>). Accordingly, for example, the "<CR>" on the sixth line in FIG. 3 is at the 212nd character position, and the first space on the seventh line is at the 213rd character position.

When the document before hand-written inputting is started is in such a state as seen in FIG. 3, if a character string of "and an operation" and a gesture (upwardly directed brace mark) instructing insertion of the character string are hand-written inputted as seen in FIG. 4, then the editing operation recognition section 15 executes pattern recognition for the locus data and recognizes that the instructed type of editing is "insertion", the insertion position is the 79th character ("h" of "have") position from the top of the document and the character string to be inserted is "and an operation". Then, the thus recognized information is stored into the editing operation storage section 17 as seen in FIG. 5.

As described already, when hand-written characters are inputted, corresponding editing operation information (position information) is supplied to the determination section 16, and the determination section 16 determines whether or not an editing operation to be executed is stored in the editing operation storage section 17. However, at the stage immediately after hand-written inputting of such a character string as "and an operation" (FIG. 4), since no editing operation is stored in the editing operation storage section 17, actual processing for the document data is not executed at all.

Then, if the user starts, as a next editing operation, such an operation as to draw a line on a character or characters as seen in FIG. 6 (inputting of a gesture instructing deletion), then the editing operation recognition section 15 recognizes that the editing operation is deletion of characters beginning with the 342nd character and notifies this to the determination section 16. In response to the notification, the determination section 16 acquires information necessary to make a determination based on the determination condition "to execute an editing operation which is an editing operation for a paragraph different from the paragraph to which the editing operation recognized by the editing operation recognition section is directed and which does not change the number of the paragraph by the editing" stored in the determination condition storage section 19.

In particular, the determination section 16 refers to the document data in the document data storage section 13 and determines, in order to determine whether or not the editing operation for the 79th character stored in the editing operation recognition section 15 is for a paragraph different from that of the editing operation for the 342nd character, whether or not there exists an array of character codes of "<CR>" and "blank" between the 79th character and the 342nd character of the document data. In this instance, since the array of the character codes is present, the determination section 16 reads out those of the document data including the 79th character (character data defined between two character code strings of the array of the "<CR>" and the "blank" or character data beginning with the top of the document data and ending with the next character code string of the array of the "<CR>" and the "blank") and stores the number of lines of the thus read out document data. Then, the determination section 16 executes the editing operation of inserting the character string of "and an operation" and compares the number of lines of a result of the editing with the number of lines before the editing.

Then, since the execution of the editing operation does not result in a change in number of lines, the determination section 16 delivers an instruction for execution of the editing operation to the document editing section 18. Consequently, the document editing section 18 actually executes the editing of the document for the document data stored in the document data storage section 13, and a result of the editing is displayed on the screen as seen in FIG. 7.

Figure 8:
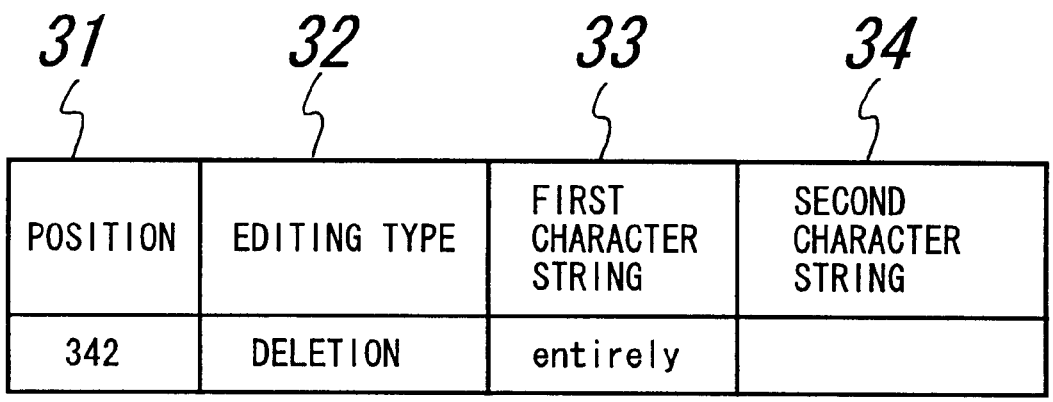
FIG. 8 is a table illustrating an outline of information stored in the editing operation storage section when the condition shown in FIG. 7 is reached.

Further, in this instance, the editing operation used for the editing by the document editing section 18 is erased from the editing operation storage section 17. Consequently, only the editing operation indicating to "delete" the character string of "entirely" beginning with the 342nd character remains stored in the editing operation storage section 17 as seen in FIG. 8.

In this manner, with the document editing apparatus of the present embodiment, when hand-written inputting is performed for the document editing apparatus, only those of editing operations stored in the editing operation storage section (editing operations having been hand-written inputted in the past) which satisfy a determination condition can be reflected on a document. Consequently, only those editing operations which do not have a bad influence on the editing working can be executed successively. As a result, the editing working can be performed efficiently.

It is to be noted that, while, in the document editing apparatus of the present embodiment, a pen and a pin inputting tablet are employed to construct the locus data inputting section and the display section is constructed using a CRT monitor or a like apparatus, the locus data inputting section may alternatively be constructed using a mouse or some other pointing device, and the display section may be constructed using a liquid crystal display unit or some other displaying apparatus.

Figure 9:
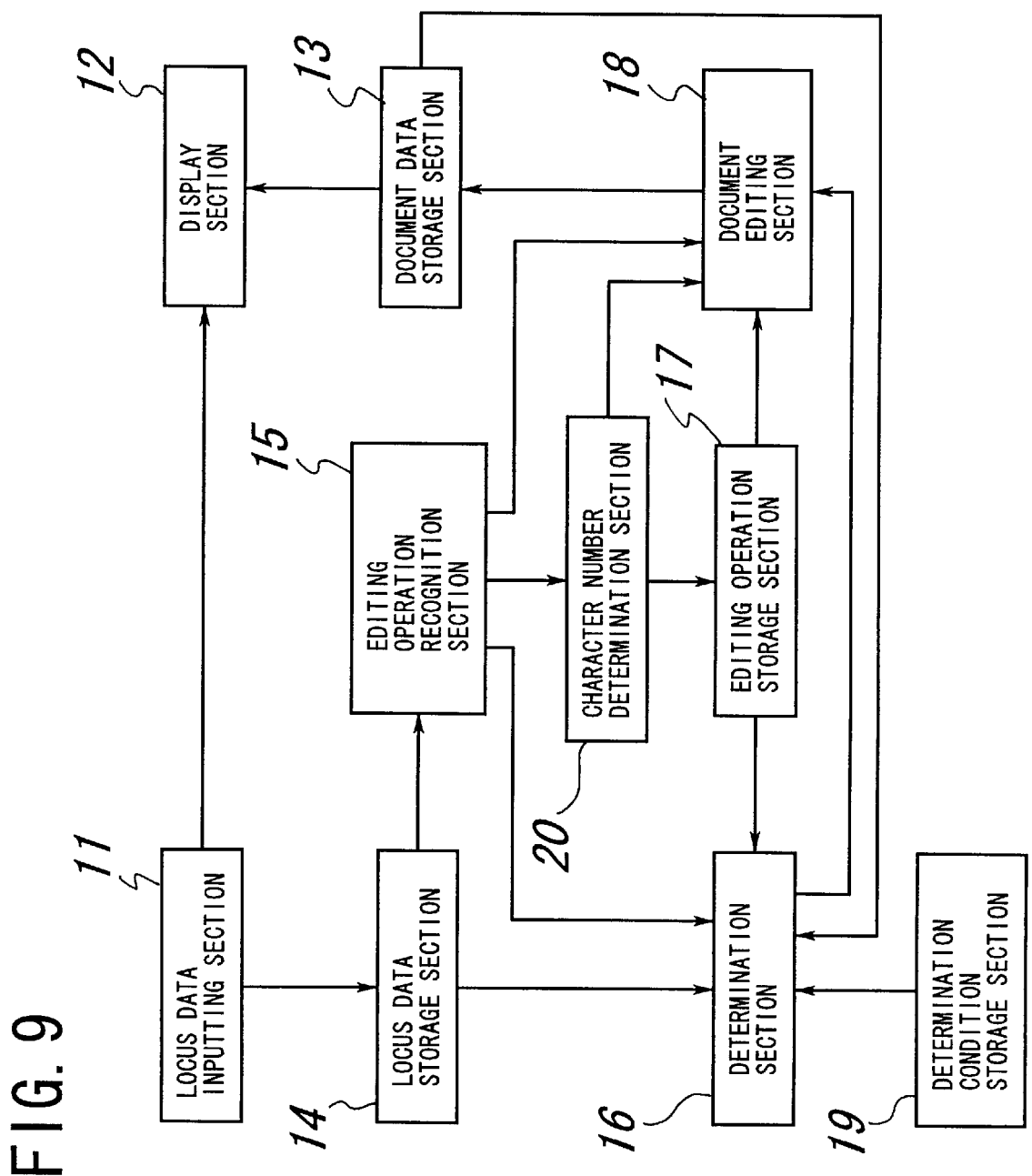
FIG. 9 is a functional block diagram of a modification to the document editing apparatus shown in FIG. 4.

FIG. 9 shows in functional block diagram a modification to the document editing apparatus of the embodiment described above. Referring to FIG. 9, the modified document editing apparatus includes, in addition to the components of the document editing apparatus of the embodiment described hereinabove with reference to FIG. 1, a character number determination section 20 interposed between the editing operation recognition section 15 and the editing operation storage section 17. The character number determination section 20 is provided to determine whether or not the number of lines of a document changes when an editing operation recognized by the editing operation recognition section 15 is performed for the document. To this end, the character number determination section 20 operates in the following procedure.

Figure 10:
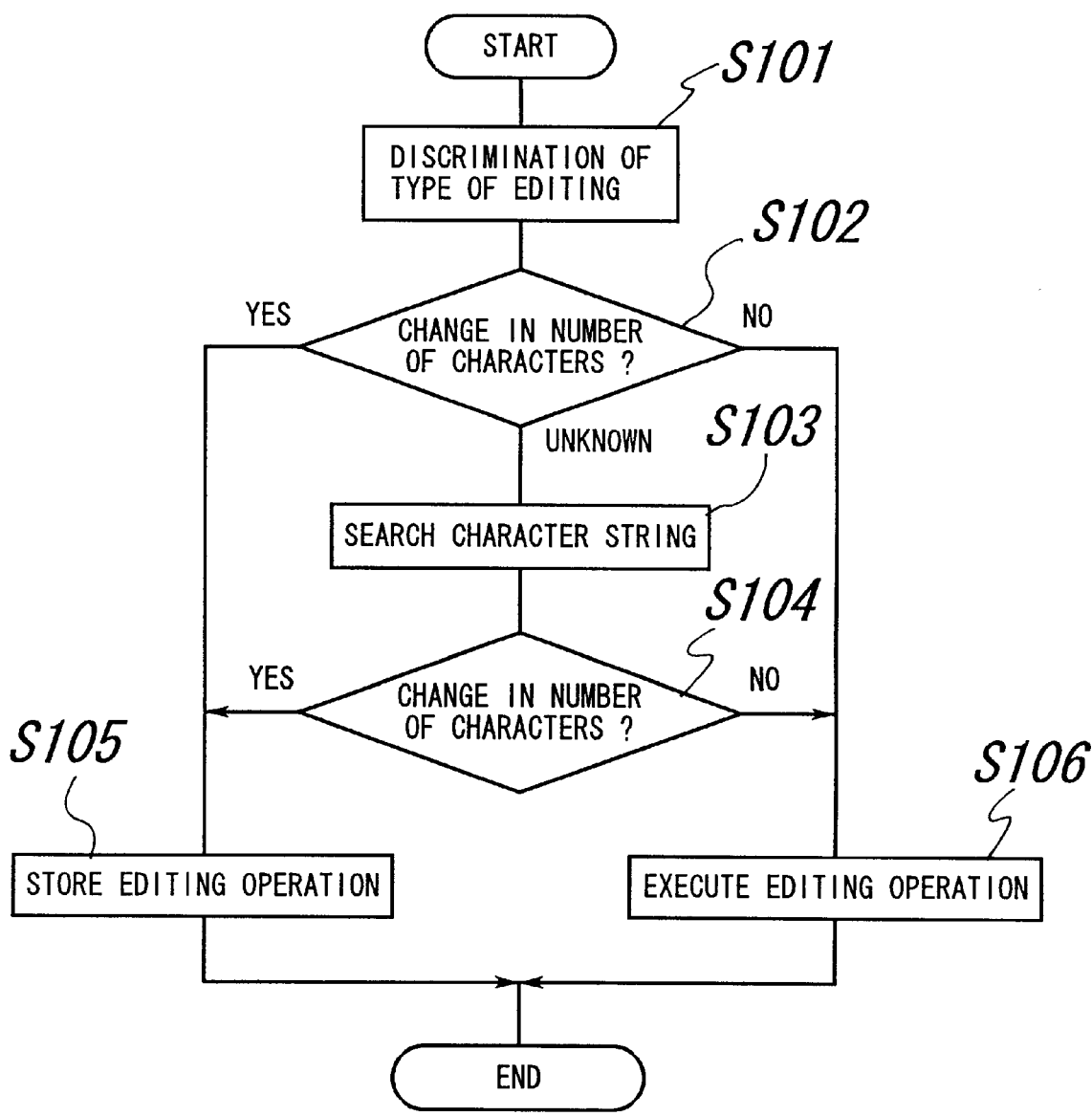
FIG. 10 is a flow chart illustrating a procedure of operation of a character number determination section provided in the modified document editing apparatus of FIG. 9.

FIG. 10 illustrates a flow of operations of the character number determination section 20 executed when an editing operation is notified from the editing operation recognition section 15. Referring to FIG. 10, upon reception of an editing operation from the editing operation recognition section 15, the character number determination section 20 determines, based on the type of editing notified thereto, whether or not the editing by the type of editing involves an increase or a decrease in number of characters (steps S101 and S102).

For example, when the editing is of a type such as insertion or deletion from which it can be apparently seen that an increase or a decrease in number of characters is involved (step S102: YES), the editing operation notified from the editing operation recognition section 15 is stored into the determination condition storage section 19 (step S105), and the processing is completed. On the other hand, when the editing is of another type such as designation of a range, character ornament or replacement of two adjacent characters from which it can be apparently seen that no increase or decrease in number of characters is involved (step S102: NO), the editing operation notified from the editing operation recognition section 15 is supplied to the document editing section 18 so that the editing operation is reflected on the document (step S106). Then, the processing is completed.

However, when the editing is of a further type such as replacement only from which it cannot be determined whether or not the editing causes an increase or a decrease in number of characters (step S102: UNKNOWN), the character number determination section 20 compares the first character string information and the second character string information with each other in length (step S13). Then, if the comparison reveals that the editing causes a change in number of characters (step S104: YES), the editing operation is stored into the editing operation storage section 17, but when the editing causes no change in number of characters (step S104: NO), the editing operation is reflected on the document (step S106), whereafter the processing is completed.

In the following, the operation of the character number determination section 20 described above will be described by way of a concrete example.

The case will be considered wherein locus data necessary to replace the character string of "character inputting" on the second line with another character string of "editing of document" (that is, the character string after the replacement, and a gesture indicating the range of the replacement (encircling of the character string)) are handwritten inputted as seen in FIG. 11. When such locus data are inputted, the editing operation recognition section 15 recognizes such information as seen in FIG. 12 and notifies it to the character number determination section 20.

Since the type of editing is "replacement", the character number determination section 20 recognizes that a check of the character strings is required, and compares the "character inputting" which is the first character string information and the "editing of document" with each other in number of characters. Then, in this instance, since the numbers of characters coincide with each other, the character number determination section 20 notifies the editing operation to the document editing section 18. As a result, the sentence wherein the character string of "character inputting" is replaced with the "editing of document" is displayed on the screen (display section 12) as seen in FIG. 13.

As apparent from FIGS. 11 and 13, even if editing which does not cause a change in number of characters is executed, no movement occurs with the remaining portion of the document at all. Consequently, the editing working is not disturbed by reflecting the editing operation on the document.

Having now fully described the invention, it will be apparent to one of ordinary skill in the art that many changes and modifications can be made thereto without departing from the spirit and scope of the invention as set forth herein.

What is claimed is:

1. A document editing apparatus, comprising:

a pointing device;

display means for displaying a document to be edited and image data representative of locus data inputted by said pointing device;

editing operation storage means for temporarily storing editing operations to be executed for the document displayed on said display means;

editing operation recognition means for recognizing, based on the locus data inputted by said pointing device, the editing operations to be executed for the document;

determination means for determining, when the editing operations are recognized by said editing operation recognition means, whether or not the editing operations stored in said editing operation storage means include an editing operation which satisfies a predetermined condition;

editing operation execution means for executing, when said determination means determines that the editing operations include an editing operation which satisfies the predetermined condition, editing corresponding to the editing operation for the document and erasing the editing operation used for the editing from said editing operation storage means; and editing operation loading means for loading the editing operations recognized by said editing operation recognition means into said editing operation storage means.

2. A document editing apparatus as claimed in claim 1, wherein the condition to be used for the determination by said determination means is that a portion of the document for which one of the editing operations recognized by said editing operation recognition means is to be performed does not move in said document display means.

3. A document editing apparatus as claimed in claim 1, wherein said determination means selects the condition to be used for the determination from within a plurality of conditions registered in advance therein.

4. A document editing apparatus as claimed in claim 1, wherein said pointing device is in the form of a pen.

5. A document editing apparatus, comprising:

a pointing device;

display means for displaying a document to be edited and image data representative of locus data inputted by said pointing device;

editing operation storage means for temporarily storing editing operations to be executed for the document displayed on said display means;

editing operation recognition means for recognizing, based on the locus data inputted by said pointing device, the editing operations to be executed for the document;

discrimination means for discriminating whether or not the number of characters of the document changes if one of the editing operations recognized by said editing operation recognition means is executed;

first editing operation execution means for executing, when said discrimination means discriminates that the number of characters of the document does not change, editing corresponding to the editing operation for the document;

determination means for determining, when the editing operations are recognized by said editing operation recognition means, whether or not the editing operations stored in said editing operation storage means include an editing operation which satisfies a predetermined condition;

second editing operation execution means for executing, when said determination means determines that the editing operations include an editing operation which satisfies the predetermined condition, editing corresponding to the editing operation for the document and erasing the editing operation used for the editing from said editing operation storage means; and editing operation loading means for loading any of the editing operations determined to cause a change in number of characters by said discrimination means into said editing operation storage means.

* * * * *